United States Patent [19]

Gilead et al.

[11] 4,413,787

[45] Nov. 8, 1983

[54] APPARATUS FOR DRIP IRRIGATION

[76] Inventors: Gideon Gilead, 5 Nicaragua St., P.O.B. 26025; Aviram Gilad, P.O. Box 26025, both of Jerusalem, Israel

[21] Appl. No.: 262,509

[22] Filed: May 11, 1981

[30] Foreign Application Priority Data

May 14, 1980 [IL] Israel ..................................... 60071

[51] Int. Cl.³ ............................................ B05B 15/00
[52] U.S. Cl. .................................................. 239/542
[58] Field of Search ..................... 405/36, 37, 43–45, 405/48, 49, 51; 239/542, 547

[56] References Cited

U.S. PATENT DOCUMENTS 4,177,946 12/1979 Sahagun-Barragan ......... 239/542 X
4,195,784 4/1980 Gilead .................................. 239/542

FOREIGN PATENT DOCUMENTS 2386252 12/1978 France ................................ 239/542

Primary Examiner—John J. Love
Assistant Examiner—Paul A. Sobel
Attorney, Agent, or Firm—Browdy and Neimark

[57] ABSTRACT

Drip irrigation apparatus comprising at least one foil element including at least one first surface having a raised pattern formed thereon and defining a portion of a pressure reducing pathway and at least one second surface joined to the at least one first surface and defining therewith the pressure reducing pathway, the at least one second surface being disposed in non-coextensive overlapping relationship with respect to the at least one first surface thereby leaving at least one water pathway between the interior and exterior of the pressure reducing pathway.

24 Claims, 16 Drawing Figures

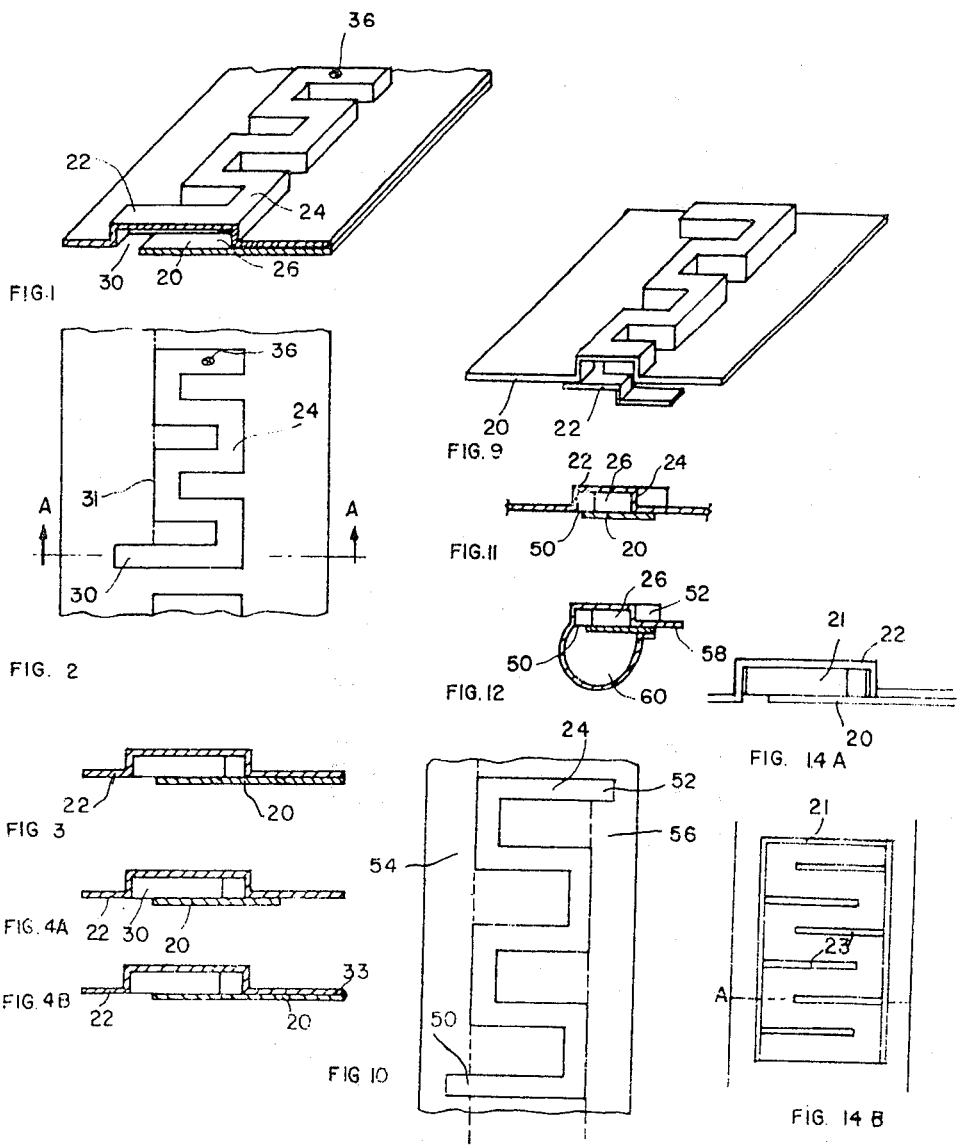

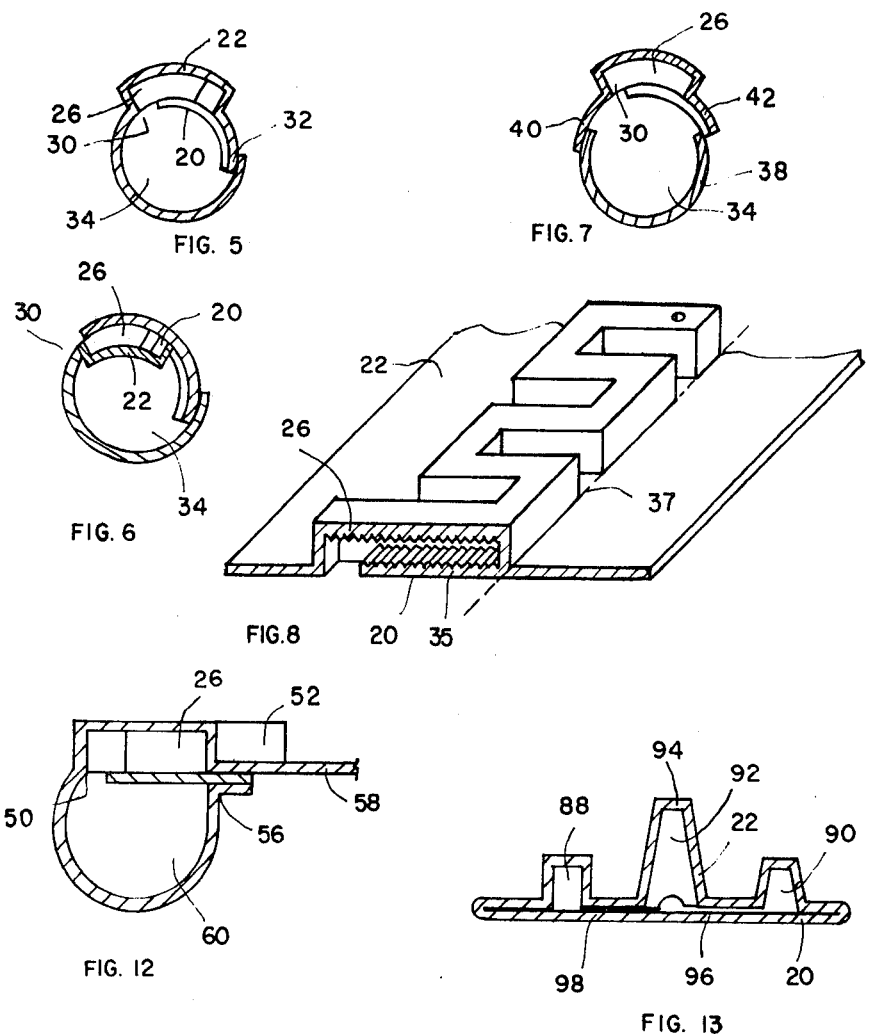

APPARATUS FOR DRIP IRRIGATION

FIELD OF THE INVENTION

The present invention relates to irrigation apparatus in general and more particularly to apparatus for drip or trickle irrigation.

BACKGROUND OF THE INVENTION

A great variety of drip irrigation devices are known in the patent literature and are presently in use. Included among these are devices described and claimed in applicant's earlier issued Israel Patents and Patent Applications 41324, 46706, 48810, 52454, 55185 and U.S. Pat. Nos. 4,175,882, 4,195,784 and 4,126,998.

Recently it has been suggested by applicant and others to use a relatively thin plastic sheet in the formation of a continuous irrigation tube having pressure reducing pathways distributed therealong in communication with a water conduit. This general concept is shown in Israel Pat. Nos. 44810 and 52454 of applicant and applicant's aforesaid U.S. Pat. Nos. 4,175,882, 4,195,784 and 4,126,998 as well as U.S. Pat. Nos. 3,873,030, 3,896,999 and 4,047,995.

In particular, U.S. Pat. Nos. 3,873,030 and 3,896,999 to Barragan illustrate a drip irrigation device employing a flexible sheet to define a water conduit and molded attachment members defining a pressure reducing channel laminated to the water conduit. U.S. Pat. No. 4,047,995 to Leal-Diaz shows a continuous irrigation hose in which the pressure reducing path is defined along an edge thereof by an embossing technique.

In the patent to Leal-Diaz as well as in the patents to Barragan, the water flow channel must be apertured in order to provide a communication pathway between the water flow channel and the pressure reducing pathway for water to enter the pressure reducing pathway. The provision of such an aperture is often inconvenient and may require a high degree of alignment and sophistication in the production process.

Applicant describes in U.S. Pat. No. 4,195,784 drip irrigation apparatus comprising a plurality of thin foils in which the aperture may be produced by stamping, laser radiation or any other hole making technique.

SUMMARY OF THE INVENTION

The present invention seeks to improve upon existing drip irrigation apparatus and to enable simplification of the manufacture thereof.

There is thus provided in accordance with an embodiment of the invention drip irrigation apparatus comprising at least one foil element including at least one first surface having a raised pattern embossed thereon and defining a portion of a pressure reducing pathway; and at least one second surface joined to the at least one first surface and defining therewith the pressure reducing pathway, the at least one second surface being disposed in non-coextensive overlapping relationship with respect to the at least one first surface thereby leaving at least one portion of the raised pattern exposed so as to define at least one water pathway between the interior and exterior of the pressure reducing pathway.

Further in accordance with an embodiment of the invention, the first and second surfaces may or may not be fully or partially bonded together. According to one embodiment of the invention the first and second surfaces may be urged together by externally applied water pressure, such as that in a water conduit contiguous therewith.

Additionally in accordance with an embodiment of the present invention, the at least one elongate foil may comprise one or more foil elements which define a water supply channel as well as the pressure reducing pathway.

BRIEF DESCRIPTION OF THE DRAWINGS

The invention will be more fully understood and appreciated from the detailed description which follows, taken in conjunction with the drawings in which:

FIG. 1 is a pictorial illustration of a drip irrigation device constructed and operative in accordance with an embodiment of the present invention;

FIG. 2 is a plan view of the drip irrigation device of FIG. 1;

FIG. 3 is a sectional view of the irrigation device of FIG. 2 taken along the lines A—A;

FIG. 4A is a sectional view of an irrigation device constructed in accordance with an alternative embodiment of the present invention;

FIG. 4B is a sectional view of an irrigation device constructed in accordance with a further alternative embodiment of the present invention;

FIG. 5 is a sectional view of a drip irrigation tube formed by folding the embodiment of FIGS. 1–3 in a first mode, FIG. 6 is a sectional view of a drip irrigation tube formed by folding the embodiment of FIGS. 1–3 in a second mode;

FIG. 7 is a sectional view of a drip irrigation tube formed using the embodiment of FIGS. 1–3;

FIG. 8 is a pictorial illustration of a drip irrigation device constructed and operative in accordance with an alternative embodiment of the present invention;

FIG. 9 is a pictorial illustration of a drip irrigation device constructed and operative in accordance with a further alternative embodiment of the present invention;

FIG. 10 and FIG. 11 are illustrations of a drip irrigation device constructed and operative in accordance with an additional alternative embodiment of the present invention FIG. 12 is a sectional illustration of a drip irrigation tube formed by folding the embodiment of FIGS. 10 and 11;

FIG. 13 is a sectional illustration of a pressure regulated outlet useful in the present invention; and FIGS. 14A and 14B are respective plan and sectional illustration of a drip irrigation device constructed and operative in accordance with the invention.

DESCRIPTION OF PREFERRED EMBODIMENTS

Reference is now made to FIGS. 1–3 which illustrate a drip irrigation device constructed and operative in accordance with an embodiment of the present invention and comprising first and second elongate foils 20 and 22, typically formed of a thermoplastic material but which may be formed of any suitable material. In the illustrated embodiment, foil 22 is formed by embossing, vacuum deep drawing or any other suitable technique to define a raised pattern 24.

According to a preferred embodiment of the invention, raised pattern 24 is in the form of a reversing pattern having a multiplicity of bends and defines a portion of a water passage, such that water passing therethrough loses pressure. Such pressure reducing pathways are described, inter alia, in applicant's earlier U.S. Pat. Nos. 4,175,882 and 4,195,784, the disclosure of which is incorporated herein by reference.

In accordance with the invention the pressure reducing pathway 26 is defined by foils 20 and 22 at the raised pattern 24. According to one embodiment, the foils may be bonded peripherally of the raised pattern to as to define the pathway. According to an alternative embodiment, the bonding is eliminated and the foils are urged against each other by water pressure produced by an adjacent water channel, thus providing a pressure regulation feature in the drip irrigation tube constructed thereby. As a further alternative, the foils may be partially bonded to each other at selected discrete locations to provide the desired pressure regulation feature that increased pressure in the water channel decreases the flow-through cross section of the pressure reducing pathway 26.

It is a particular feature of the present invention that foil 22 is disposed in a non-coextensive overlapping relationship with respect to foil 20 thus leaving a portion 30 of the raised pattern exposed, thereby to define a water pathway between the interior and the exterior of the pressure reducing pathway 26.

In the illustrated embodiment, raised patterns 24 are formed periodically along the length of the elongate foil 22 and are formed at one extreme end thereof with a portion 30 whose transverse extent is beyond the common line 31 of the remainder of the pattern. Foil 20 is positioned with respect to foil 22 such that it covers all of the pattern 24 except for portion 30 and thus defines a pathway communicating between the interior and exterior of the water communication pathway 26.

According to an alternative embodiment of the invention, pattern 24 may define a plurality of portions 30 which extend beyond the common line of the remainder of the pattern, so as to provide a plurality of such communication pathways.

FIG. 4A illustrates an alternative construction in which foil 20 is not coextensive with foil 22 at either of its elongate edges. FIG. 48 illustrates another alternative construction in which foils 20 and 22 are constructed of a single foil folded at an edge 33.

Reference is now made to FIGS. 5-7 which show drip irrigation tubes formed of the articles illustrated in FIGS. 1-3 by folding thereof. FIG. 5 shows a drip irrigation tube constructed by folding the article of FIGS. 1-3 such that foil 22 lies externally and by sealing the free edges of the article of FIGS. 1-3 at a seam 32. In this embodiment, exposed portion 30 defines a water inlet from a water channel 34 into the pressure reducing pathway 26. The outlet of the pressure reducing pathway 26 may be a conventional hole 36 (FIGS. 1 and 2) or any other suitable aperture made by any suitable technique or a pressure regulated outlet as shown in FIG. 13.

FIG. 6 shows the article of FIGS. 1-3 folded and sealed in a sense opposite to that of FIG. 5, such that foil 20 is disposed externally and portion 30 defines a water outlet from pathway 26. The inlet to pathway 26 may be defined by any suitable technique. It is noted that in the embodiment of FIG. 6 the water channel 34 is defined entirely by foil 22, while in the embodiment of FIG. 5, the water channel 34 is defined partially by foil 22 and partially by foil 20.

FIG. 7 illustrates an irrigation tube formed by attaching a third foil 38 to the extreme longitudinal edges of the article of FIGS. 1-3 defining longitudinal seams 40 and 42 therealong and defining a water channel 34 which communicates with pathway 26 via portion 30.

It is appreciated that the embodiment of FIG. 7 may also be constructed in the sense of FIG. 6 such that portion 30 defines an outlet rather than an inlet.

FIG. 5 defines and described a further alternative embodiment of a drip irrigation device which is substantially similar to that illustrated in FIGS. 1-3 and is also provided with a conditioned inner surface of the pressure reducing pathway 26 to increase the resistance to water throughflow and thus increase the pressure reducing efficiency of the pathway. FIG. 8 also illustrates another feature of the invention, the construction of a drip irrigation device of a single integral foil element which defines a plurality of foil surfaces, corresponding to surfaces 20 and 22 of the embodiment of FIGS. 1-3. In the embodiment illustrated in FIG. 8, the single foil element may be considered to define an outer surface 22 as well as an inner surface 20 integrally formed therewith as a flap 35. According to one embodiment of the invention, the flap is joined with outer surface 22 only along a junction line 37 and is urged against the raised pattern 24 by external pressure, which may be exerted by water in a water channel 34, if the device of FIG. 8 is folded and sealed in the sense of FIG. 5. Alternatively, the flap 35 may be sealed to outer surface 22 at other locations.

It is appreciated that the devices illustrated in FIGS. 1-6 may also be constructed of a single unitary foil having an integrally formed flap.

FIG. 9 illustrates another alternative embodiment in which both foil surfaces 20 and 22 are formed to define raised patterns which co-operate to define a pressure reducing pathway.

FIGS. 10 and 11 illustrate an embodiment of the invention in which foil surfaces 20 and 22 are configured and positioned so as to define a pressure reducing pathway having exposed portions which define an inlet and an outlet for the pathway 26. In this embodiment, foil surface 22 is formed with a raised pattern 24 having portions 50 and 52 extending beyond lines 54 and 56 which define the maximum transverse extent of the remainder of pattern 24.

Foil 20 is positioned so as to overlap pattern 24 between lines 54 and 56, thus leaving portions 50 and 52 exposed to define water passages between the interior and exterior of pressure reducing pathway 26.

FIG. 12 shows a drip irrigation tube in which the free edge 58 is sealed to the remainder of the article along line 56 thus defining a water supply channel 60. Water channel 60 communicates with the pressure reducing pathway 26 via exposed portion 50 which defines an inlet. Water leaves the pressure reducing pathway via exposed portion 52 which defines an outlet to the atmosphere.

FIG. 13 illustrates a pressure regulated outlet which is suitable for use in combination with any of the embodiments of the invention illustrated hereinabove. The outlet comprises first and second foil surfaces 20 and 22. Foil surface 2 is embossed or otherwise formed to define a raised pattern, while foil surface 20 is sealed peripherally of the pattern and is urged against the interior of the raised pattern by externally applied pressure, such as water pressure in a water supply channel contiguous with surface 20, by an amount determined by that pressure. The volumes 88 and 90 are in fluid communication with a pressure reducing pathway 26 while a volume 92 is in fluid communication with the outlet opening 94. Pressure regulated passageways 96 and 98 are defined between non-raised portions of foil surface 22 and foil surface 20 and define pressure regulated valves which govern the supply of water from the pressure reducing pathway 26 to the outlet opening 94 as a function of the externally applied pressure to foil surface 20.

FIGS. 14A and 14B illustrate an alternative embodiment of the invention which is substantially similar to that of FIGS. 1-3 except in that the pressure reducing pathway is defined by inner and outer surfaces 20 and 22 as well as by an intermediate member 21 which defines baffles 23. In this embodiment, surfaces 20 and 22 may be smooth and do not require embossing. The intermediate member 21 may be conveniently molded of plastic.

It will be appreciated by persons skilled in the art that a great number of variations and combinations of constructions may be made on the basis of the examples herein described. For example, the water conduit may be associated with the pressure reducing pathway and constructed in a wide variety of ways and a selected number of inlets and outlets may be associated with the pressure reducing pathway in accordance with the present invention.

The invention is not limited to what has been shown and described hereinabove. Rather the scope of the invention is defined only by the claims which follows.

We claim:
1. Drip irrigation apparatus comprising:
at least one foil element including at least one first surface having a raised pattern formed thereon and defining a portion of a pressure reducing pathway; and
at least one second surface joined to said at least one first surface and defining therewith said pressure reducing pathway;
said at least one second surface being disposed in non-coextensive overlapping relationship with respect to said at least one first surface thereby having at least one portion of said raised pattern exposed so as to define at least one water pathway between the interior and exterior of said pressure reducing pathway.

2. Drip irrigation apparatus according to claim 1 and wherein said water pathway defines a water inlet to said pressure reducing pathway.

3. Drip irrigation apparatus according to claim 1 and wherein said water pathway defines a water outlet from said pressure reducing pathway.

4. Drip irrigation apparatus according to claim 1 and wherein said at least one elongate foil comprises at least one third surface joined with said pressure reducing pathway to define a water supply conduit.

5. Drip irrigation apparatus according to claim 4 and wherein said water pathway communicates between said pressure reducing pathway and said water supply conduit.

6. Drip irrigation apparatus according to claim 4 and wherein said water communication pathway communicates between said pressure reducing pathway and the outside atmosphere.

7. Drip irrigation apparatus according to claim 1 and wherein said at least one foil element comprises a single foil.

8. Drip irrigation apparatus according to claim 1 and wherein said at least one foil element comprises a plurality of foils.

9. Drip irrigation apparatus according to claim 1 and wherein said at least one foil element comprises a single foil element having at least three elongate side edges.

10. Drip irrigation apparatus according to claim 1 and wherein said at least one foil element comprises a tubular element.

11. Drip irrigation apparatus according to claim 1 and wherein said at least one foil element comprises at least three free elongate side edges.

12. Drip irrigation apparatus according to claim 1 and wherein said pressure reducing pathway comprises an elongate raised portion and said at least one second surface terminates thereunder thereby to define a water communication pathway extending along the length of said elongate raised portion.

13. Drip irrigation apparatus according to claim 1 and wherein at least a portion of said water communication pathway extends between said first and second surfaces and is operative as a pressure regulator.

14. Drip irrigation apparatus according to claim 1 and wherein at least a portion of said first and second surfaces defining said pressure reducing pathway is formed with a conditioned surface for increasing frictional resistance to water flow therethrough.

15. Drip irrigation apparatus according to claim 1 and wherein said first and second surfaces define a pressure regulating outlet pathway along which said second surface is selectably positionable against said first surface in response to ambient pressure against said second surface.

16. Drip irrigation apparatus according to claim 4 and wherein said first and third surfaces are integrally formed.

17. Drip irrigation apparatus according to claim 4 and wherein said first and second surfaces are integrally formed.

18. Drip irrigation apparatus according to claim 4 or 7 and wherein said single foil is folded and sealed to define said water supply conduit, said pressure reducing pathway and said water communication pathway.

19. Drip irrigation apparatus according to claim 1 and also comprising pressure regulated outlet means communicating with said pressure reducing pathway.

20. Drip irrigation apparatus according to claim 1 and wherein said second surface is integrally formed with said at least one first surface in a flap like arrangement and lies against said raised pattern without being sealed thereto.

21. Drip irrigation apparatus according to claim 20 and wherein said second surface is arranged to be contiguous to said water supply conduit, such that the pressure in said water supply conduit governs the amount of space defined between the first and second surfaces.

22. Drip irrigation apparatus according to claim 1 and wherein said second surface is integrally formed with said at least one first surface in a flap like arrangement and is at least partially sealed thereto.

23. Drip irrigation apparatus comprising:
at least one foil element including at least one first surface defining a portion of a pressure reducing pathway; and
at least one second surface joined to said at least one first surface and defining a portion of said pressure reducing pathway;

said at least one second surface being disposed in non-coextensive overlapping relationship with respect to said at least one first surface thereby leaving at least one portion of said pressure reducing pathway exposed so as to define at least one water pathway between the interior and exterior of said pressure reducing pathway.

24. Drip irrigation apparatus according to claim 23 and also comprising an intermediate element disposed between said first and second surfaces for defining said pressure reducing pathway.

* * * * *